United States Patent
Buriano et al.

(10) Patent No.: US 8,356,350 B2
(45) Date of Patent: Jan. 15, 2013

(54) METHOD AND SYSTEM FOR MANAGING DENIAL OF SERVICE SITUATIONS

(75) Inventors: Luca Buriano, Turin (IT); Fabrizio Caffaratti, Turin (IT); Paolo De Lutiis, Turin (IT); Fabia Ferreri, Milan (IT)

(73) Assignee: Telecom Italia S.p.A., Milan (IT)

( * ) Notice: Subject to any disclaimer, the term of this patent is extended or adjusted under 35 U.S.C. 154(b) by 1113 days.

(21) Appl. No.: 11/791,719

(22) PCT Filed: Nov. 29, 2004

(86) PCT No.: PCT/EP2004/053163
§ 371 (c)(1),
(2), (4) Date: Aug. 16, 2007

(87) PCT Pub. No.: WO2006/056239
PCT Pub. Date: Jun. 1, 2006

(65) Prior Publication Data
US 2008/0040801 A1 Feb. 14, 2008

(51) Int. Cl.
*G06F 11/00* (2006.01)
*G06F 12/14* (2006.01)
(52) U.S. Cl. .................. 726/22; 726/23; 726/24; 726/25
(58) Field of Classification Search .................. None
See application file for complete search history.

(56) References Cited

U.S. PATENT DOCUMENTS

| | | | |
|---|---|---|---|
| 6,578,147 B1 | 6/2003 | Shanklin et al. | |
| 6,944,673 B2 * | 9/2005 | Malan et al. | 709/237 |
| 7,013,482 B1 * | 3/2006 | Krumel | 726/13 |
| 7,069,588 B2 * | 6/2006 | Call et al. | 726/22 |
| 7,313,092 B2 * | 12/2007 | Lau et al. | 370/230 |
| 2002/0038430 A1 | 3/2002 | Edwards et al. | |
| 2002/0095492 A1 | 7/2002 | Kaashoek et al. | |

(Continued)

FOREIGN PATENT DOCUMENTS

EP 1 392 037 B1 2/2004

OTHER PUBLICATIONS

Wu et al.; "SCIDIVE: A Stateful and Cross Protocol Intrusion Detection Architecture for Voice-over-IP Environments", School of Electrical & Computer Eng., Purdue University, pp. 1-20. (2003).

(Continued)

*Primary Examiner* — William Powers
(74) *Attorney, Agent, or Firm* — Finnegan, Henderson, Farabow, Garrett & Dunner, L.L.P.

(57) ABSTRACT

For managing denial of service situations at an application level in a communications network receiving message data, the message data are monitored in a sensor that sends an event message when detecting an alarm condition; a control logic detects a first analysis to be performed associated with the received event message and generates a request; an analysis module receives the request of analysis, performs the analysis and sends a result message; the control logic receives the result message and detects an action to be taken associated with the result message, the action being a countermeasure or a further analysis. For determining the analysis to be performed and the action to be taken, the control logic browses rules stored in a memory, each rule including a conditional clause and an associated action to be taken.

25 Claims, 5 Drawing Sheets

U.S. PATENT DOCUMENTS

| | | | |
|---|---|---|---|
| 2003/0226035 | A1 | 12/2003 | Robert et al. |
| 2004/0037326 | A1 | 2/2004 | D'Souza et al. |
| 2004/0098618 | A1 | 5/2004 | Kim et al. |
| 2004/0153665 | A1* | 8/2004 | Browne .................. 713/201 |
| 2004/0193943 | A1* | 9/2004 | Angelino et al. ............. 714/4 |

OTHER PUBLICATIONS

Ptacek, T. H. et al., "Insertion, Evasion, and Denial of Service: Eluding Network Intrusion Detection," Internet Publication, XP002341276, 24 pages, (Jan. 1998).

Karig, D. et al., "Remote Denial of Service Attacks and Countermeasures," Princeton University Department of Electrical Engineering Technical Report, XP002341277, pp. 1-17, (Oct. 2001).

Scott, S. J., "Threat Management Systems—The State of Intrusion Detection," Internet Publication, XP002341278, pp. 1-12, (Aug. 9, 2002).

Debar, H. et al., "Towards a Taxonomy of Intrusion-Detection Systems," Computer Networks, vol. 31, pp. 805-822, (1999).

Montessoro, P. L. et al., "Towards Effective Intrusion Prevention: Developing an Open Framework for Integrated Network Security," Proceedings of SSGRR2003S, International Conference on Advances in Infrastructures for Electronic Business, Science and Education on the Internet, XP002341279, pp. 1-7, (Jul. 28, 2003).

Knuutinen, S. et al., "Session Initiation Protocol Security Considerations," Mobile Networks Based on IP Protocols and Unlicensed Radio Spectrum—Seminar on Interworking, Spring 2003, XP002341280, pp. 1-13, (May 28, 2003).

Sorensen, S., "The Need for Pervasive Application-Level Attack Protection," Juniper Networks White Paper, XP002341281, pp. 1-14, (Nov. 8, 2004).

Wu et al.; "SCDIVE: A Stateful and Cross Protocol Intrusion Detection Architecture for Voice-over-IP Environments", School of Electrical & Computer Eng., Purdue University, pp. 1-20.

D'Souza et al.; "Detection of Denial-of-Service Flood Attacks Against SIP-Based Network Infrastructure", Research & Innovation Dept., Alcatel, pp. 1-21, (2003).

Reynolds; "Enabling Secure IP Telephony in Enterprise Networks", Brennen Emerick Reynolds B.S. (University of California, Davis), pp. i-viii and pp. 1-74, (2001).

\* cited by examiner

METHOD AND SYSTEM FOR MANAGING DENIAL OF SERVICE SITUATIONS

CROSS REFERENCE TO RELATED APPLICATION

This application is a national phase application based on PCT/EP2004/053163, filed Nov. 29, 2004.

TECHNICAL FIELD OF THE INVENTION

The present invention relates to the field of communications using a communication network such as Internet. The invention is applicable to application contexts as SMTP (Simple Mail Transfer Protocol), HTTP (Hypertext Transfer Protocol), SIP (Session Initiation Protocol), CORBA (Common Object Request Broker Architecture) and Web Services, without being limited thereto. In particular, the invention relates to a method and system for managing situations that may cause a denial of service, such as malicious attacks.

BACKGROUND ART

As is known, Denial of Service (DoS) attacks focus on rendering a particular server element unavailable. This can be achieved by flooding the victims of the attack with a large amount of fake traffic in order to consume the server resources. The attacker plans to do Denial of Service in order to prevent system from normal work. Then, a legitimate access to the system could be prevented. Usually, an application server, like a Web and SIP server, faces the public, insecure, Internet. Then it is potential victim to Denial of Service.

Generally, even in an intranet scenario, the Web and SIP Server could be the target of large volume of traffic, generated, for example, by viruses or misconfigured clients. A SIP server creates a large number of potential opportunities of DoS attacks that must be recognized and addressed by the telecommunication operators in order to provide the continuity of the services.

Among the different DoS type attacks, the Application level attacks are the most difficult ones to be recognized.

In Next Generation Networks (NGNs), protocols as SIP, HTTP and Web Service are used heavily. NGN applications, and most of the added value services provided by telecommunication operators, are however liable to Application Level DoS.

Consider for example a SIP architecture including, among others, terminals such as IP (Internet Protocol)-phones, Proxy servers, and Registrar servers and using messages having fixed signaling methods, including INVITE and REGISTER categories.

Examples of DoS attacks in such a scenario, are:
INVITE-flood toward IP-Phones or SIP servers; and
REGISTER-flood toward Registrar servers.

In general, a good solution for Denial of Service should comply with the following requirements:
the DoS detection mechanism should not be vulnerable by a DoS attacks too. For example, if the mechanism maintains a state (a table in memory), that table should be protected against being overloaded with fake entries;
the robustness of the detection mechanism should not be based on a secret algorithm (i.e. even if the attacker knows the detection algorithm, he/she cannot compromise the effectiveness of the detection).
Numerous systems and methods of managing DoS attacks have been proposed.

A particular architecture, described in "Secure Telephony Enabled Middlebox including dedicated sensors" (http://seclab.cs.ucdavis.edu/papers/reynoldsMSthesis.pdf), hereinbelow also referred to as "Reynolds", considers a flood attack of SIP INVITE.

Reynolds (see in particular chapter 5.4) considers that, under normal IP telephony, the number of initiated handshakes should be very close to the number of completed handshakes within fixed observation period and that a key characteristic of application layer DoS attack is that the handshaking process will not be completed. Therefore, if the difference between the number of initiated and completed handshakes suddenly becomes very large, it is strong indication that the system is under attack. The model used here defines the distribution of calls to different URIs (Uniform Resource Identifier). The detection of an attack within a single observation period is based upon the expected value of a normalized value $X_n$, calculated based on $\Delta_n/\overline{C}_n$, wherein $\Delta_n$ is the number of established attempts minus the number of completed handshakes and $\overline{C}_n$ is the average number of connections. To ensure that short high volume attacks as well as longer low volume attacks are detected, the algorithm includes a cumulative sum component. If the cumulative sum component exceeds a pre-determined threshold value, the system is considered under attack.

"Detection of Denial-of-Service Flood Attacks Against SIP-based Network Infrastructure" (http://www.upperside.fr/sip2004/sip2004program.htm) proposes to use the imbalance between incoming INVITE and outgoing 180. It maintains fixed size "hit tables" that serves for tracking the number of full authentication cycles done, contains unique call-info (Call-ID or nonce) from outgoing 407 messages; new records replace randomly chosen existing ones. When an incoming INV-cr (i.e., INVITE with credential presented) is observed, this proposal searches the table with its call-info, counts a "hit" and deletes the record, if any.

US-A-2003/0226035 refers specifically to TCP (Transmission Control Protocol) services wherein a client wishing to make connection with a host sends a synchronization (SYN) signal to the host. This document discloses a method of detecting TCP SYN flooding attacks based on a counting arrangement in which, i.a., SYN packets are counted, weighting factors are applied to each count and an abnormal number of unsuccessful connection attempts is determined based on a parameter calculated using the weighting factors in conjunction with the respective counts.

EP-A-1 392 037 describes a method and apparatus performing a frequency analysis on certain types of packets that arrive with periodic nature. A frequency power spectrum obtained through Fourier Transform reveals whether the power level of any particular frequency is greater than the average power spectrum. The detection of a higher than average power level is an indication that an attack is in progress.

US-A-2004/0037326 discloses a method for mitigating DoS attacks using frequency domain techniques to detect packet flooding in which a frequency spectrum reveals a periodic pattern to the attack packets. A pulse generator is used to create pulses having the frequency and phase of the periodic pattern. New packets arriving simultaneously with the created pulses are dropped from the system and packets which are not synchronized with the pulse generator are passed through the system normally.

U.S. Pat. No. 6,578,147 describes a system for detecting unauthorized signatures to or from a local network. Multiple sensors are connected at an internetworking device, which can be a router or a switch. The sensors operate in parallel and each receives a portion of traffic through the internetworking device, at a session-based level or at a lower (packet-based) level. Depending on the type of internetworking device (router or switch) the load balancing mechanism that distributes the packets can be internal or external to the internetworking device. Also depending on the level of packet distribution (session-based or packet-based), the sensors share a network analyzer (if session-based) or both a network analyzer and a session analyzer (if packet-based).

US-A-2004/986181 discloses a system for defending against a distributed DoS attack on active network by removing an agent and a master program for use in the distributed denial-of-service attack and isolating the attacker on the entire network.

US-A-2002/0095492 discloses a system for thwarting denial of service attacks on a victim data centre. The system includes a first plurality of monitors that monitor network traffic flow through the network. The system includes a central controller that receives data from the plurality of monitors, over a hardened, redundant network. The central controller analyzes network traffic statistics to identify malicious network traffic. A gateway device passes network packets between the network and the victim site, is disposed to protect the victim site, and is coupled to the control center by the redundant hardened network.

US-A-2002/0038430 refers to a system for the collection, analysis, and distribution of cyber-threat alerts. The system collects cyber-threat intelligence data from a plurality of sources, and then preprocesses the intelligence data for further review by an intelligence analyst (human). The analyst reviews the intelligence data and determines whether it is appropriate for delivery to subscribing clients of the cyber-threat alert service. The system reformats and compiles the intelligence data and automatically delivers the intelligence data through a plurality of delivery methods.

US-A-2003/0084329 discloses a method of preventing intrusions on a node of a network comprising monitoring, by a first layer of an intrusion prevention system, application data of applications running at on the node, monitoring, by a second layer of the intrusion prevention system, transport layer data of the node, and monitoring, by a third layer of the intrusion prevention system, network layer data of the node is provided.

Applicant has noted that the above solutions are in general specific to a particular attack and are not able to manage a variety of situations, including:
    message flooding originated by a malicious attacker (human being or a computer program);
    client misconfiguration, wherein a huge number of useless (and annoying) messages are exchanged between the client and the server, for example when an automatic process generates an endless cycle of authentication messages, where each authentication requests is rejected due to the missing (or wrong) user credential; and
    attacks toward the service logic coded in the application programs, for example when a malicious attacker generates a message in a manner to stress the parsing process performed by the server, thereby causing an abnormal resource consumption and, consequently, a DoS.

Applicant has further noted that an intrusion detection system operating at the network or transport level is generally vulnerable to application-level DoS attacks as the application-level messages cannot be discerned by a detection system that operates at lower levels.

"SCIDIVE: A Stateful and Cross Protocol Intrusion Detection Architecture for Voice-over-IP Environments" (http://dynamo.ecn.purdue.edu/~sbagchi/Research/Papers/Scidive_dsn04_cameraready.pdf) detects an Intrusion Detection System structured to detect different classes of intrusions. This prior system uses a Distiller, through which all incoming network traffic passes and which translates packets into protocol dependent information units called Footprints. The Footprints that belong to the same session are grouped into Trails. The Event Generator maps Footprints into Events which are matched by the Rule Matching Engine against a Ruleset. Here, the Event Generator is hard-coded, seamlessly coupled with internal structures, so as to correlate the information in footprints and concentrate the information into a single event; a sequence of events triggers a Ruleset.

Applicant has observed that matching of events against a Ruleset supposes that the classes of intrusion are known in advance, thereby limiting the flexibility of the detection system.

OBJECT AND SUMMARY OF THE INVENTION

The aim of the present invention is therefore to provide a system able to detect a wide spread of potentially dangerous situations, including both malicious attacks, and non-malicious, dangerous events, such as software bugs, human mistakes and software misconfiguration, that could fall down the quality of service and consequently cause a DoS. The system according to the invention should be able to manage such dangerous situation, while at the same time reducing the incidence of false alarms.

According to the present invention, there is provided a method for managing DoS situations at an application level in a communications network (1) receiving message data, comprising:
    monitoring said message data;
    generating (30) at least one event message;
    characterized by:
    determining (35) a first analysis to be performed associated with said event message;
    generating (40) a request of said first analysis;
    receiving said request of first analysis, performing (45) said first analysis and sending (50) a first result message;
    receiving said first result message and determining (55) an action to be taken associated with said first result message;
    generating (65) a countermeasure message according to a countermeasure to be taken.

According to the present invention, there is also provided a system for managing DoS situations at an application level in a communications network receiving message data, comprising:
    at least one event sensor (10; 72) configured to monitor said message data and to generate at least one event message;
    a control logic (11; 76) configured to receive said event message and to detect DoS situations;
    characterized by:
    a plurality of analysis modules (12; 73, 74), connected to said control logic and each configured to execute at least one analysis and to generate a result message;
    said control logic (11; 76) being configured to determine a first analysis to be performed associated with said event message, to generate a request of said first analysis for at least one of said plurality of analysis module (12; 73, 74), to receive said result message from said requested analysis module, to determine an action to be taken associated to said result message; and to generate a countermeasure message according to a countermeasure to be taken.

The present method and system are intended for managing application level DoS attacks, wherein the application level can be represented as the level (or levels) above the transport level. In particular, the application level can be represented (in a non-limiting way) by Layer 7 as defined in the Open Systems Interconnection (OSI) Model.

In one embodiment, DoS situations are brought to an administrator or somebody else and, if provided for, the system applies a countermeasure.

The present method and system exploit specialized sensors (e.g. statistical sensors) monitoring each a specific event and generating event messages that are expanded through specific analysis of the network traffic and computer systems state. Thus, the event messages are sent to a control logic that, based on the specific event signaled, after browsing stored rules, controls performing of the prescribed analysis to gather a better intelligence on the suspected DoS attack. The different analyses are carried out by specific analysis modules, activated by the control logic and inform the control logic of the analysis result. At the end of the analysis process, a countermeasure is requested by the control logic to a specific countermeasure module. For example, an alarm message is sent to a human security administrator of the system.

BRIEF DESCRIPTION OF THE DRAWINGS

For a better understanding of the present invention, a preferred exemplary non-limitative embodiment will now be described with reference to the attached drawings, wherein.

DETAILED DESCRIPTION OF PREFERRED EMBODIMENTS OF THE INVENTION

In the following description of an embodiment of the present invention, the following definitions apply:

Event: a potentially dangerous situation for the services or the systems to be protected or monitored (systems under surveillance). That situation can be related to malicious activities or to unspecified technical problems arising during the normal "distribution" of the service (i.e. owing to a legitimate software agent not well configured that can cause a huge amount of unnecessary network traffic). The events usually cause an abnormal consumption of the available resources: CPU cycles, main memory, network bandwidth and so on. Such abnormal resources consumption leads the services or the system to a DoS situation. Examples of event are: huge amount of CPU cycles for a normal situation, high network messages transmission rate, high main memory consumption rate.

Sensor: hardware or software entity specialized in the detection and in the signaling of the events. Example: a sensor can be specialized to monitor and signal when the CPU consumption of a computer system is higher than a specific threshold. Another sensor can be specialized to monitor and signal when the statistical behavior of specific network message sent to a server is over a predefined threshold. A further sensor can be specialized to monitor the consumption of the CPU of a server.

Analysis: it is a process aimed to the identification of useful information and data for detecting whether a DoS situation (and potentially a DoS attack) occurs.

Countermeasure: actions performed in order to react to an alleged DoS situation.

Log: sequential records of information related to the network traffic (e.g. messages exchanged among the computer systems) and the status of the computer system under observation (e.g. CPU, RAM and other). In particular, the traffic log contains data source of each incoming packet.

Environment: set of information related to the computer system configuration (e.g. number of network interfaces, number of CPU) and to the network service configuration (e.g. Domain Name Service for the resolution of Internet addresses, black list of Internet domain from which any requests should be denied, and so on).

Figure 1:
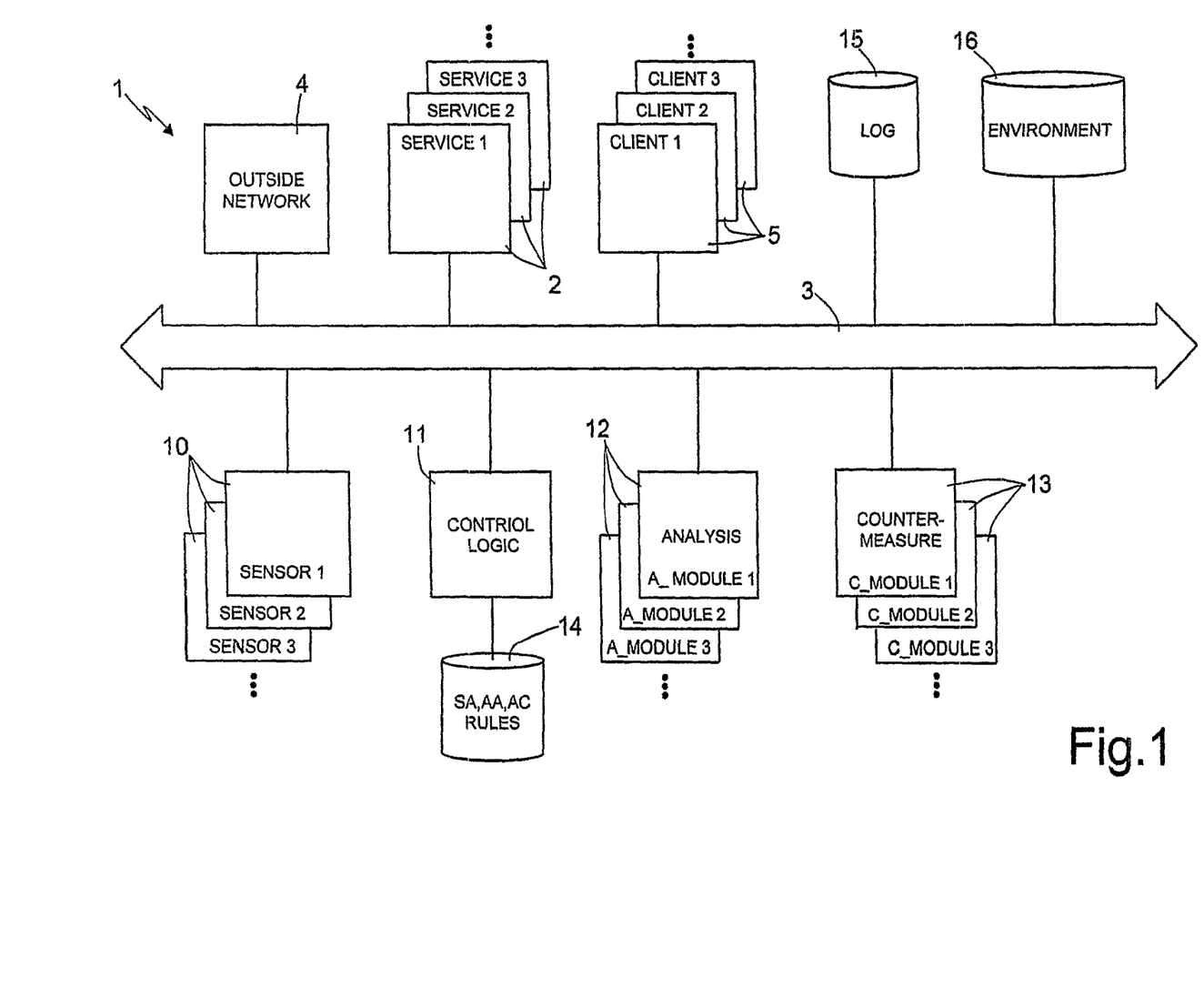
FIG. 1 shows a block diagram of a user system according to an embodiment of the present invention.

FIG. 1 shows an embodiment of the architecture of a system 1 aimed at detecting potential DoS situations, operating at an application level.

System 1 comprises at least one service provider 2 (in FIG. 1, a plurality of service providers 2, indicated at SERVICE1, SERVICE2, . . . ) that is to be protected from DoS situations. The service provider 2 is e.g. a VoIP operator, an electronic business transaction system, a banking service, a web page, etc. that is connected, through an intranet connection network 3, to an outside network 4 (an Extranet, such as, but not limited to, Internet). At least one client 5 (in FIG. 1, a plurality of clients 5, indicated at CLIENT1, CLIENT2, . . . ) is also connected to the intranet 3. Here, the term client refers to any personal computer, terminal or intelligent apparatus connected to the intranet connection network 3 that may be, e.g., misconfigured and thus cause a DoS.

The system 1 comprises at least one sensor 10 (in FIG. 1, a plurality of sensors 10, indicated at SENSOR1, SENSOR2, . . . ), a control logic unit 11, at least one analysis module 12 (in FIG. 1, a plurality of analysis modules 12, indicated at A_MODULE1, A_MODULE2, . . . ) and at least one counter-measure module 13 (in FIG. 1, a plurality of counter-measure modules 13, indicated at C_MODULE1, C_MODULE2, . . . ). A rule memory 14 is connected to the control logic unit 11.

The system 1 also comprises a LOG unit 15 storing the sequential records of information related to the network traffic (as above explained) and an ENVIRONMENT unit 16, storing the information related to the computer systems configuration and to the network service configuration (as also above explained).

In the scheme of FIG. 1, each sensor 10 is aimed at the detection of a specific event, as discussed above in the definition portion. An example of sensors 10, suitable for an application-level protocol like SIP or HTTP, is the Frequency Sensor (FS). In the present context, the frequency sensor monitors the rate of arrival of communication requests within a configurable time unit and, when the count exceeds a threshold, the sensor 10 is triggered.

The control logic unit 11 is an intranet node that drives the overall flow of the operations in the system 1, in particular it receives messages from the sensors 10 and, on the basis of the rules stored in the rule memory 14, requests the analysis modules 12 and the counter-measure modules 13 to perform specific actions. In the present context, the control logic unit 11 is always triggered by one or more sensors 10 so as to request the execution of the analysis process and, if necessary, the activation of the countermeasures.

Each analysis module 12 is an intranet node that is able to carry out analysis as requested by the control logic unit 11.

For example: after a frequency type sensor has signaled an abnormal number of specific network messages, the control logic unit 11 triggers an analysis module in order to verify if all the messages have been sent by (or originated from) a same network address.

The countermeasure modules 13 are triggered by the control logic unit 11 and may be triggered one at a time or some or all of them simultaneously. According to an example, a countermeasure module 13 can be activated by the control logic 11 after a result of the analysis from analysis module(s) 12 is produced. For example, a countermeasure module 13 may be responsible for sending an alarm message (SMS, e-mail, pager) to a human security administrator of the system 1, the message containing the details of the sensors triggered and the results of the analysis process performed. As another example, a countermeasure module 13 may generate an automatic feed-back to the various components of the system 1 in order to change their configuration without a human intervention.

The LOG unit 15 stores the log information, as above discussed, as necessary for the analysis process.

The ENVIRONMENT unit 16 stores the environment information, as above indicated. The LOG unit 15 and the ENVIRONMENT unit 16 may be implemented by two distinct hardware, as shown, or by a single hardware.

The rule memory 14 is a hardware storing all the control rules to be activated by the control logic unit 11. The rule memory 14 stores different kinds of rules: a first type, regarding sensor triggering and requesting execution of analyses (called SA rules), a second type, regarding the evaluation of the results from the executed analyses and comprising, if necessary, the request of executing further analyses (called AA rules), and a third type, also regarding result analysis but requiring countermeasures (called AC rules), as discussed in more detail hereinbelow. All rules are structured so as to specify the relationship between one or more occurred and/or verified conditions and one or more actions to be taken; in particular the rules are structured as condition-action rules, including a conditional part, representing the rule preconditions, and an action part, determining the list of actions that must be executed when the conditional part of the rule is satisfied.

The rule memory 14 may be physically separated from the control logic unit 11 or integrated in a single device therewith; furthermore it may comprise a single portion or be divided in different portions or submemories, each storing a specific type of rules.

All the components of the system 1 communicate via the intranet connection network 3 using a same or a different network messaging layer, such as JMS (Java Message Service). Specific components may also communicate through different network protocols, such as Java RMI (Java Remote Method Invocation).

Figure 2:
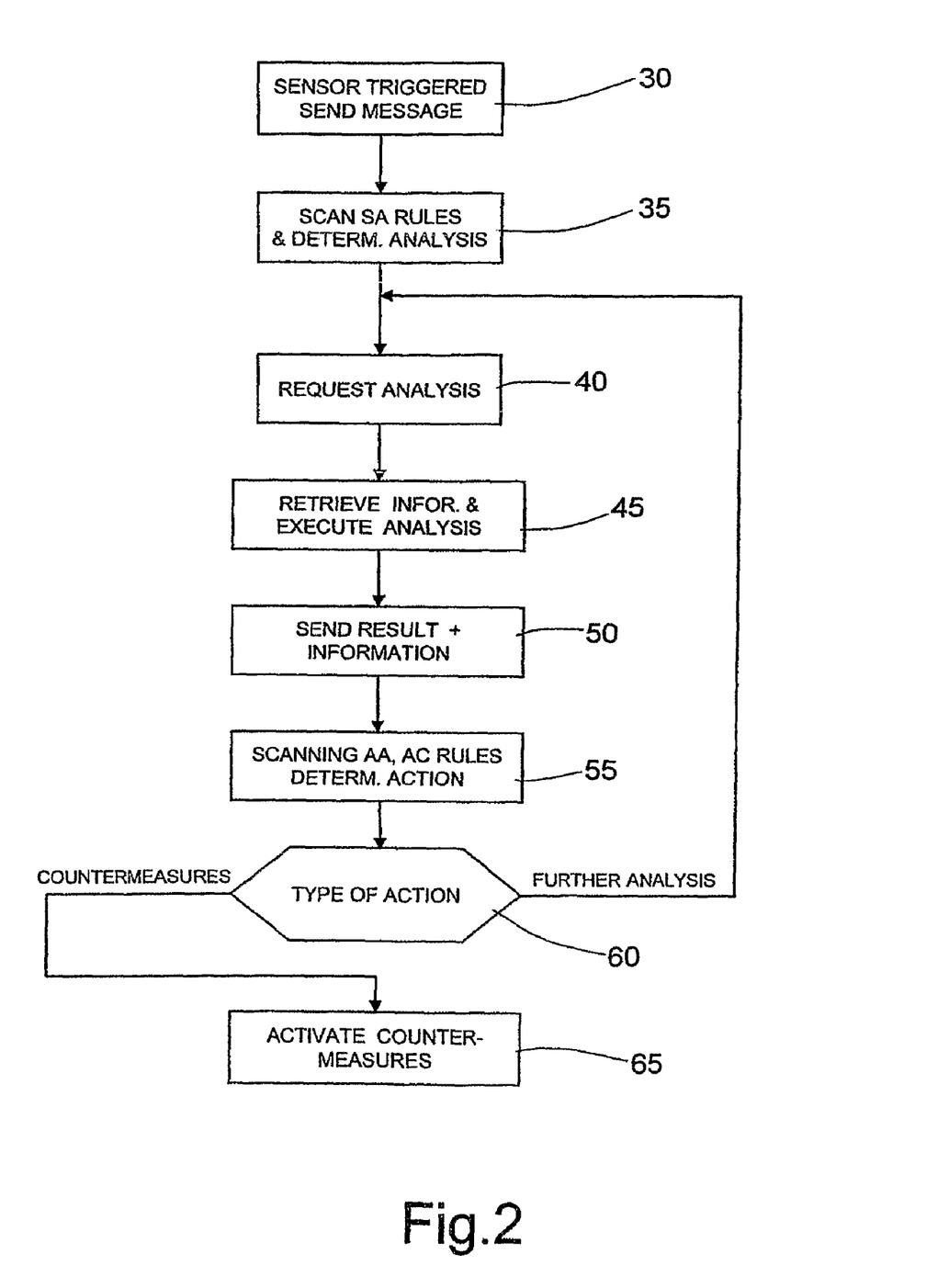
FIG. 2 shows a flow chart of the method implemented by the system according to FIG. 1.

The flow of actions performed by system 1 of FIG. 1 will be now described making reference to FIG. 2.

As above indicated, the detection process begins when one or more sensors 10 is triggered, as depicted by block 30. For example, as indicated, a frequency sensor 10 is triggered when the counter of communication requests within the predetermined time unit reaches a threshold. In this situation, the triggered sensor(s) 10 send(s) a message to the control logic unit 11. The message contains the information related to the event detected by the triggered sensor(s) 10 and the sensor identification data.

After receiving the message, block 35, the control logic unit 11 browses the rules stored in the rule memory 14 and related to the sensor triggering (in other words, the control logic unit 11 browses the SA rules). In one embodiment, the control logic unit 11 browses the rule(s) associated to the triggering of the specific sensor(s) 10; in another embodiment, the control logic unit 11 browses the rule(s) associated to the detected event. In both cases, all the rules connected with sensor triggering are scanned and the conditional part of each rule is evaluated.

For example, the rule regarding the triggering of the frequency sensor may be drafted as follows:

| Conditional part | Action part |
|---|---|
| IF - The frequency sensor is triggered | THEN - Execute a Source Clustering Analysis |

If the preconditions are satisfied, the rule is fired.

The conditional part may also prescribe a list of sensors 10 that must be triggered in order to fire the rule. In this case, all the sensors 10 belonging to the list must be triggered in order to fire the rule. Therefore, if the rule provides for a list of sensors 10, the control logic unit 11 checks if the list of sensors 10 in the condition part is a subset of the list of triggered sensors 10 and in this case fires the rule.

The action part of a rule determines the analysis to be executed. Thus, when a rule is fired, the control logic unit 11 sends a request to one or more analysis module(s) 12, on the strength of the fired rule, block 40.

Specifically, with the request, the control logic unit 11 sends the set of analyses to be executed, as specified by the action part of the triggered rule, and, for each triggered sensor 10, any information related to the event detected by the sensor.

Each analysis module 12 that has been so requested retrieves the information needed in order to execute the analysis from both the LOG unit 15 and the ENVIRONMENT unit 16 and, on the basis of the information received from the control logic unit 11, actually executes the requested analysis, block 45.

Each analysis outputs a specific result, representing data about the analysis findings. The actual form of the resulting data depends on the specific analysis considered.

An example of analysis is the "source clustering" analysis, as indicated in the "conditional part" of the above rule. This analysis is suitable for a set of network packets belonging to a protocol, like the SIP protocol, where each packet includes some sort of information about its origin (i.e. the SIP URL address in the FROM header of the SIP message). The goal is to check if, in the incoming packet flow, there is any overrepresented source, indicating a potential origin point of a malicious attack or network failure.

This analysis groups the packets according to their source (as obtained from the LOG unit 15), and counts the number of packets belonging to each different source group. If any group scores a count that exceeds a predefined threshold percentage with respect to the global number of packets, then the analysis outputs that source and that percentage as outputs. If none of the groups exceeds the threshold, the analysis outputs a "source clustering analysis failure" result message. The eventual list of sources (or the failure message) represents the analysis result.

Then, block 50, the activated analysis module(s) 12 sends the analysis result to the control logic unit 11.

As a consequence, block 55, the control logic unit 11 browses the rules stored in the rule memory 14 and related to the analysis results (in other words, the control logic unit 11 browses the AA and the AC rules), and if the preconditions are satisfied, fires the rule.

The AA and AC rules have the same structure as the SA rules above described; in this case, the rule preconditions determine a set of conditions based on the results from one or more of the performed analyses and the action part specifies the action to be taken. In particular, for AA and AC rules, the action part specifies either a new set of analyses to be executed and, respectively, a set of countermeasures to be carried out.

In fact, the completed analysis may require the execution of additional analyses in order to refine the previous analyses and to extract more information about the eventual DoS situation. In this case, the action part determines the list of new analyses that must be executed when the conditional part of the rule is satisfied.

As an example, an AA rule may be drafted as follows:

| Conditional part | Action part |
| --- | --- |
| IF - the Clustering Source Analysis results in a non-empty list of sources | THEN - Execute the Intranet Check Analysis, checking if the sources are internal to the local Intranet |

Thus, the control logic unit 11 checks the type of action required or type of fired rule, block 60 and, if the action part requires execution of further analyses, it sends a request to one or more analysis module(s) 12, on the strength of the fired rule, together with informations about the results of the previous analyses. This is represented in FIG. 2 as a return to block 40.

An example of an AA analysis is the "Intranet Check Analysis", as indicated in the "action part" of the above rule. This analysis is suitable for detecting whether the DoS situation is due to a potentially misconfigurated client(s) 5 belonging to the system 1 and which client(s) 5 has/have caused it. In the alternative, the AA analysis may be directed to discover whether any known external sources, known to be a potential origin of DoS, is overrepresented.

Therefore, analogously to the above, the activated analysis module 12 retrieves from the LOG unit 15 and from the ENVIRONMENT unit 16 the information needed in order to execute the analysis and actually executes the new analysis.

The above sequence of requesting analyses, performing analyses, and scanning the rules (blocks 40, 45, 50, 55 and 60) may be iterated a few times, as long as an AA rule is fired and specifies, as the action part, the execution of further analyses.

If instead a AC rule is fired (the action part of the fired rule specifies a set of countermeasures to be carried out), the control logic unit 11 activates the specified countermeasure, block 65. Here the term countermeasure refers to a large variety of action, including sending an alarm message. Also in this case, the rule preconditions determine a set of conditions based on the results from one or more of the previous analyses and these conditions must be satisfied in order to fire the AC rule.

As an example, an AC rule may be drafted as follows:

| Conditional part | Action part |
| --- | --- |
| IF - the Clustering Source Analysis results in a non-empty list of sources AND - the Intranet Check Analysis results in some sources being internal to the local Intranet | THEN - Execute the Local Administrator Notification Countermeasure about these sources |

Thus, if the fired rule is of the AC type, the control logic unit 11 activates the countermeasure provided for in the fired rule, block 65.

In particular, the control logic unit 11 sends to the specified C_module 13 the information required to execute the countermeasures to be executed, such as the set of countermeasures to be executed; for each triggered sensor 10, any information related to the event detected by the sensor; as well as the results obtained from the performed analyses. For each countermeasure, the triggered C_module 13 retrieves the information related to the events detected, retrieves the analyses and actually executes the countermeasure.

An example of countermeasure is the "Local Administrator Notification", consisting in sending an auto-generated notification email to the system administrator responsible for the local Intranet. This email will contain a report detailing the sensors triggered, the analysis executed, and their results, allowing the administrator to know about the DoS situation and to take the opportune actions.

As a particular case, an SA rule may specify to bypass the analysis process, through a "NULL Analysis" rule. The NULL Analysis is a process without any output and it is used to force a direct flow from the triggering of a sensor 10 to the activation of a countermeasure module 13.

In this way, the system 1 is capable of detecting a wide range of possible DoS problems: message flooding, client misconfiguration, attacks toward the service logic coded in the application programs (e.g. the parsing algorithms of the message) and so on; the system is also capable to distinguish the process in progress.

This ability is due to the high flexibility and modularity of the system 1.

As an example of a network that may exploit advantageously the architecture and method just described, the application of system 1 to a SIP network will be presented hereinbelow.

In a SIP network the most typical attack is a flood INVITE attack, like the HTTP flood request. Here, the network elements (SIP proxy) are bombarded by enormous requests forbidding new incoming requests to be processed. Therefore, the following detailed description refers to a flood INVITE attack, although the invention is applicable to either several SIP message type flooding (e.g. REGISTER, PUBLISH, etc.) and other DOS situation (e.g. malformed SIP messages crafted to consume the computing resources of the SIP server). The invention can be applied also to other application contexts as SMTP, HTTP, CORBA and Web Services.

Figure 3:
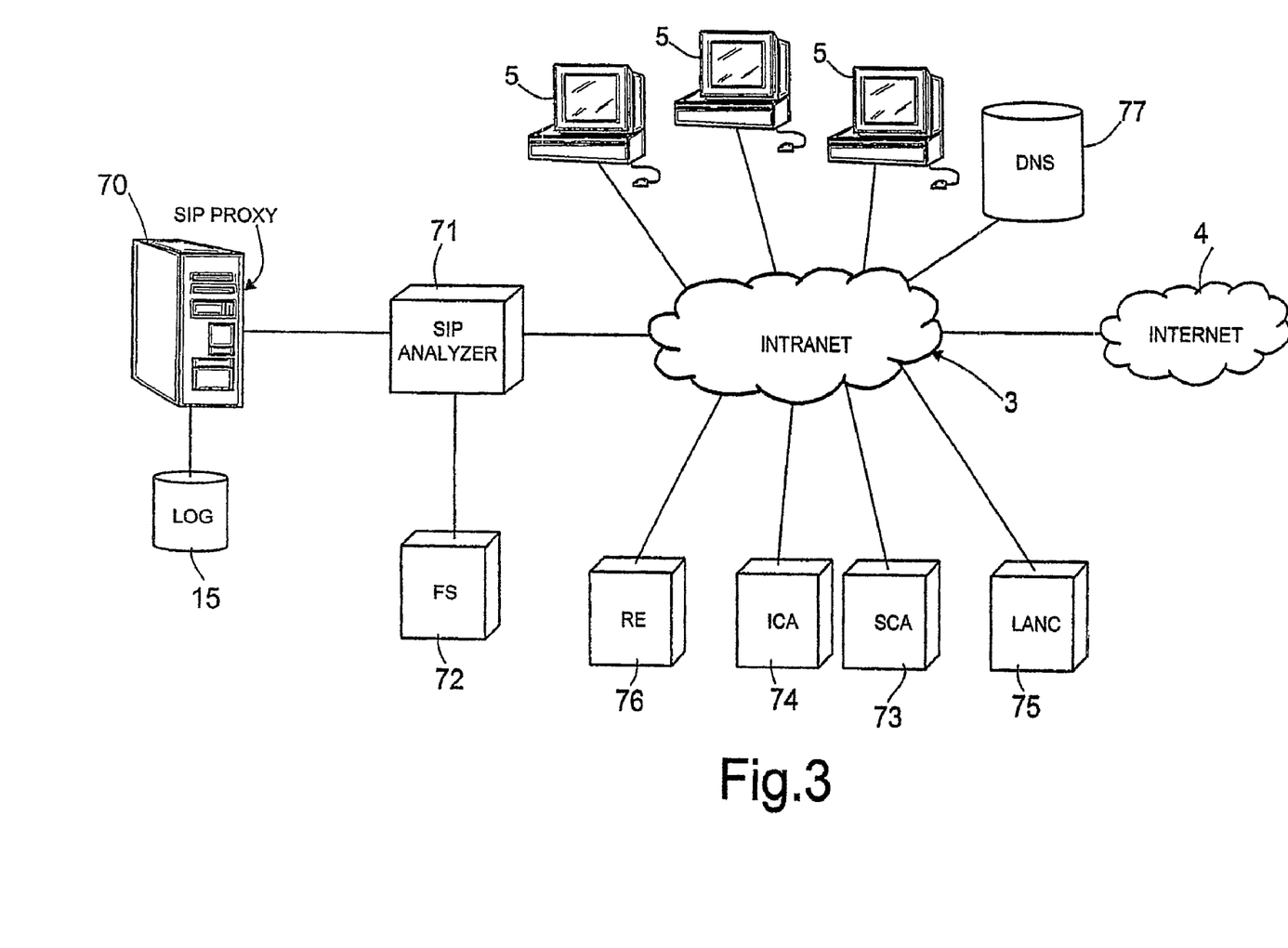
FIG. 3 shows a block diagram of a user system of the SIP type.

The SIP scenario exemplary system architecture includes the following components (see FIG. 3):

a SIP proxy server module (or SIP proxy 70), implemented on a network node belonging to an intranet environment, managing all SIP traffic incoming to and outgoing from the intranet, as well as the SIP traffic internal to the intranet;

as a preferred element, a SIP flow protocol analyzer module (or SIP analyzer 71), listening to all SIP traffic directed to or originated from the SIP proxy server 70; the SIP analyzer 71 is inserted outside of the SIP proxy 70. Examples of implementations of flow protocol analyzer 71 are the network protocol analyzer Ethereal or the open-source network intrusion detection system Snort™;

a Frequency Sensor (or FS sensor 72), as an example of the sensors 10 of FIG. 1;

an SIP Source Clustering Analysis module (or SCA module 73), as an example of an analysis module 12, an Intranet Check Analysis module (or ICA module 74), as another example of an analysis module 12, an LANC module 75, implementing a Local Administrator Notification Countermeasure;

a Rule Engine (RE) module 76, implementing the control logic unit 11 and the rule memory 14.

In FIG. 3, the LOG unit 15 is connected to the SIP proxy server 70; the environment is stored in a DSN (Domain Name Server) module 77. Furthermore, three clients 5 have been shown, and the external network 78 is Internet. The services are not represented.

The various components communicate using the intranet communication network 3, via a network messaging layer, such as JMS (Java Message Service), or other network protocols, such as Java RMI (Java Remote Method Invocation, as for the data transfer between the SIP protocol analyzer 71 and the Frequency Sensor 72) and FTP (File Transfer Protocol, as for the file transfer between the SIP proxy server 70 and the SCA module 73).

The RE module 76 manages the analysis control logic and drives the overall flow of operations in the system. Furthermore RE module 76 stores the sets of rules (SA, AA and AC rules), written in a suitable formalism (i.e. an XML logic rule language).

In particular, the RE module 76 receives JMS messages from the FS sensor 72 and the SCA, ICA modules 73, 74, applies the rules and sends messages to the same SCA, ICA modules 73, 74 and the LANC module 75.

Figure 4:
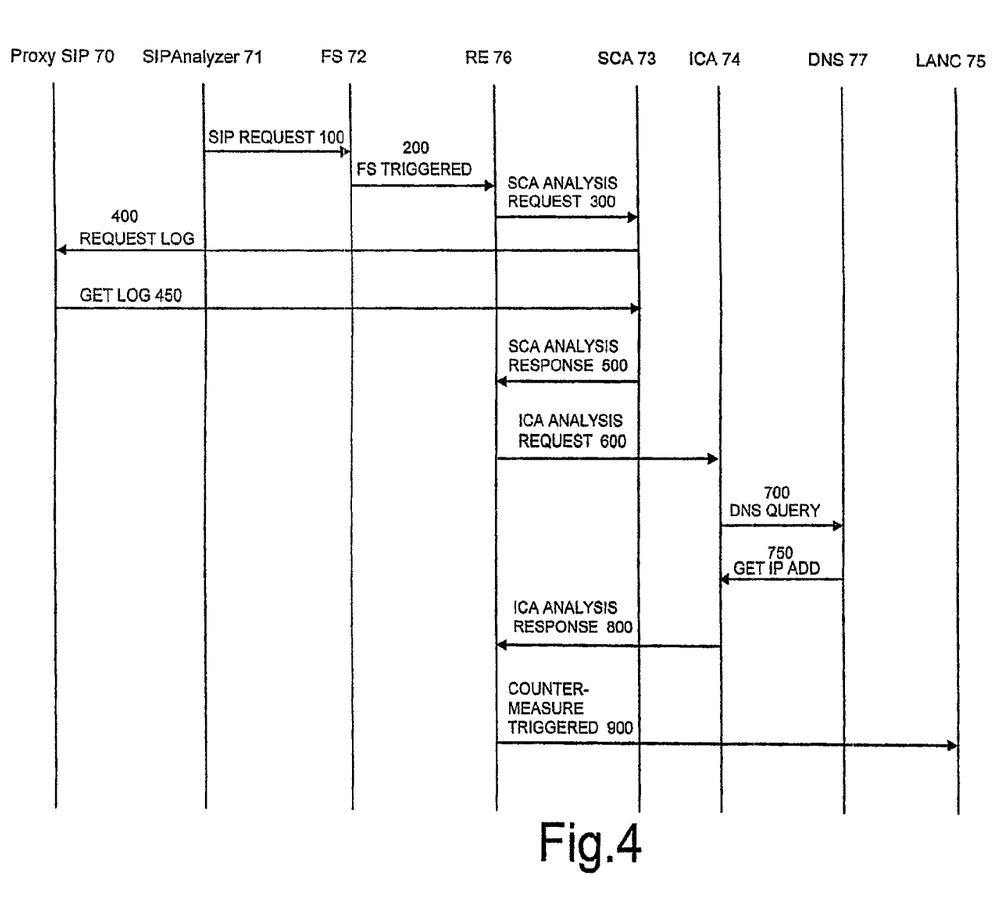
FIG. 4 shows a chart of the sequence of communications exchanged among the elements of the system of FIG. 3.
Figure 5:
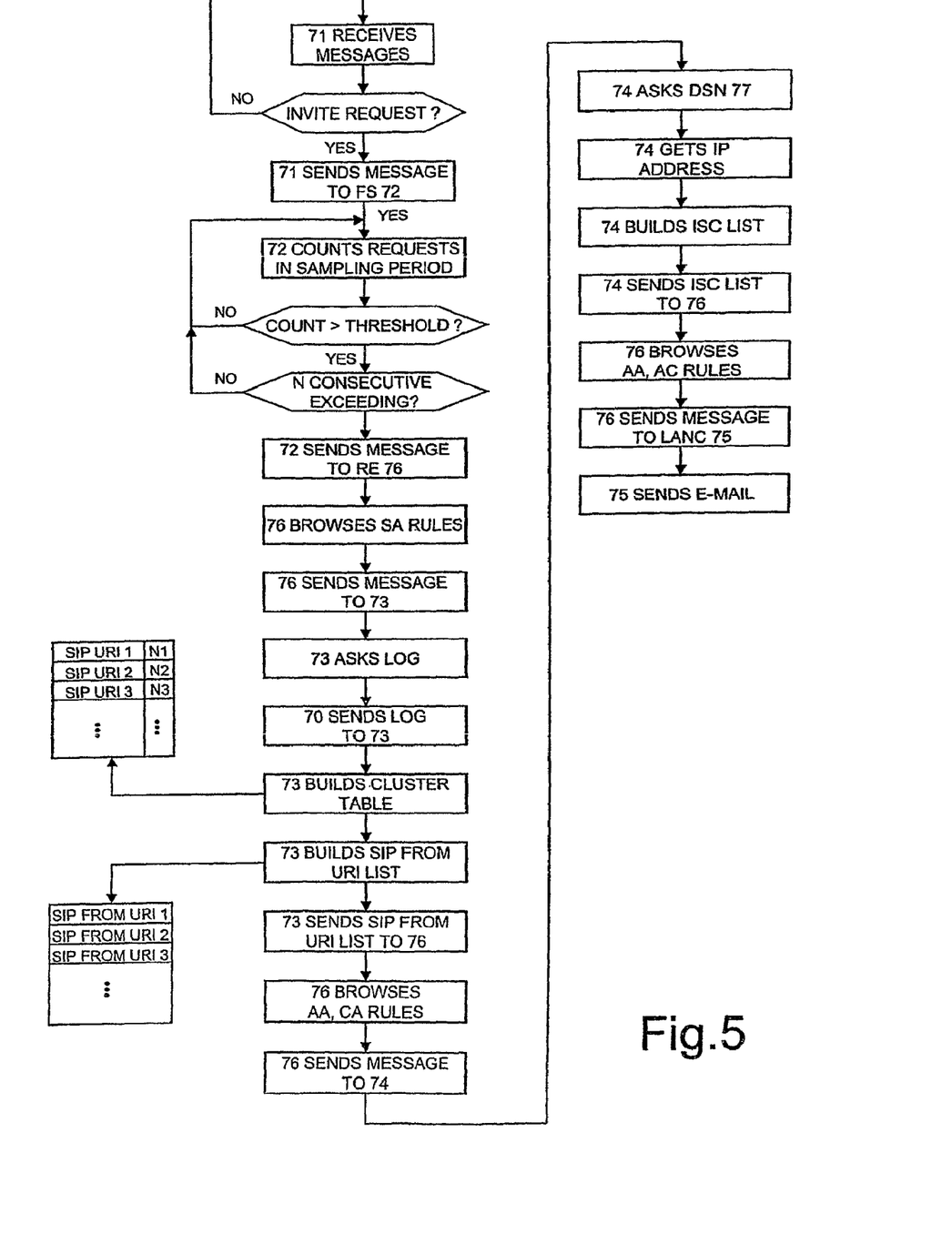
FIG. 5 shows a flow-chart of an embodiment of the method of detecting DoS in the system of FIG. 3.

A typical flow of operation steps performed by the SIP network of FIG. 3 will be now described with reference to FIGS. 4 and 5.

The SIP analyzer 71 receives the traffic passing through the SIP proxy 70 and filters the UDP (User Datagram Protocol) or TCP packets extracting the SIP requests. To this end, the SIP analyzer 71 checks the first line of the SIP message, which indicates the type of request. When the SIP analyser 71 detects an INVITE request, it transfers such request to the FS sensor 72 (step 100).

The FS sensor 72 monitors the arrival rate of SIP messages coming from the SIP analyzer 71 and triggers itself when an anomalous (i.e. too high) message arrival rate is observed. In particular, the FS sensor 72 counts the messages representing INVITE requests during an observation period; at the expiration of the sampling period, the value of the counter is compared with a predetermined threshold. If the counter exceeds this threshold, the FS sensor 72 is triggered.

The observation period (sampling period) is a configuration parameter of the FS sensor 72; e.g. a period of 60 sec may be set. The threshold used to evaluate the arrival rate is preferably selected as an n-th percentile (e.g. 99th percentile) of the statistical distribution of the rates of INVITE messages in a usual SIP traffic.

Furthermore, in order to make the behavior of the FS sensor 72 more robust and limit the number of false positive events, according to a different embodiment, the FS sensor 72 triggers only if the counter exceeds the threshold in a preset number NJ of consecutive sampling periods.

When the FS sensor 72 is triggered, it sends a JMS message to the RE module 76 (step 200). The RE module 76, after receiving the JMS message, browses the SA rules. For example, the following rule is found:

| Conditional part | Action part |
| --- | --- |
| IF - The frequency sensor is triggered | THEN - Execute a Source Clustering |

This SA rule prescribes, if the FS sensor 72 is triggered, to execute a Source Clustering Analysis (SCA) and may be expressed as follows:

```
<Rule type="SA">
    <IF>
        <Condition>
            <Event type="triggered"
            element="FrequencySensor_v5.21"/>
        </Condition>
    </IF>
    <THEN>
            <Action type="execute" element="SCA_v4.3"
            input=null>
    </THEN>
</Rule>
```

The condition of this rule holds. Therefore, the RE module 76 sends a JMS message to the SCA module 73, asking to perform the analysis (step 300).

After receiving JMS message, the SCA module 73 requests the SIP traffic log file from the SIP proxy 70 (step 400). The log file is then transferred from the SIP proxy 70 to the SCA module 73 (step 450), for example, transfer may be carried out via FTP (File Transfer Protocol). The SIP traffic log file contains information about all recent SIP messages received and sent by the SIP proxy 70. In particular, for each SIP message received (sent) by the SIP proxy 70, the log reports:

the time at which the SIP message has been received (sent) by the SIP proxy 70;

the SIP message.

Then, the SCA module 73 performs the SCA analysis. The goal of this analysis is to check if in the incoming SIP messages flow there is any over-represented source, indicating a potential origin point of malicious attack or network failure.

In particular, the SCA module 73 performs the following steps:

for each SIP INVITE message received from the SIP proxy 70 and appearing in the traffic log, it examines the SIP FROM header;

it extracts the SIP FROM URI (Uniform Resource Identifier, giving information about the source of the SIP message) from the SIP FROM header;

it builds a table, called CLUSTER TABLE, containing an entry for each distinct SIP URI extracted in the previous two steps, together with a number representing the total number of occurrences of that URI in the examined SIP messages. Therefore the CLUSTER TABLE reports, for each distinct source address, the number of SIP messages coming therefrom. Hereinafter, each table entry is called a "source cluster", while the associated number of SIP messages is called the "dimension" of the source cluster;

it compares the dimension of each source cluster, considered in percentage with respect to the sum of the dimensions of all source clusters, to a preset dimension threshold (e.g. a fixed percentage, such as 30%, as well as the maximum size, in percentage, observed for a source cluster in the usual traffic);

if the source cluster dimension exceeds the threshold, then it adds the SIP FROM URI denoting the source cluster to a SIP FROM URI list;

at the end of the SCA analysis, it sends a JMS message including the SIP FROM URI list to the RE module 76 (step 500).

Thus, the RE module 76 receives a list (SIP FROM URI list) that may be empty (no source cluster dimension exceeding the threshold) or contain some URIs.

The RE module 76, after reception of the JMS message, browses the AA and AC rules.

For example, the following AA rule is found:

| Conditional part | Action part |
| --- | --- |
| IF - the SCA analysis results in a non-empty SIP FROM URI list | THEN - Execute the ICA analysis |

This AA rule prescribes, if the SIP FROM URI list contains some data, to execute an Intranet Check Analysis (ICA) and may be expressed as follows:

```
<Rule type="AA">
    <IF>
        <Condition>
            <Event type="analysis_result" element=" SCA_v4.3"
            results_var="res" condition="non-empty"/>
        </Condition>
    </IF>
    <THEN>
        <Action type="execute" element="ICA_v2.2"
        input=res>
    </THEN>
</Rule>
```

Let's suppose that the list of sources is actually non-empty, and that the condition of the rule holds. Thus, the RE module 76 sends a JMS message to the ICA module 74, asking to perform the analysis (step 600).

The RE module 76 includes the results of SCA analysis (SIP FROM URI list) as part of the JMS message.

When the ICA module 74 receives the JMS message from the RE module 76, it checks if the main sources of incoming SIP message traffic are internal to the local Intranet, or external to it.

In particular, the ICA module 74 performs the following steps:

for each source URI appearing in the SIP FROM URI list, it requests the DSN module 77 to send the internet IP address obtained resolving the domain portion of the URI (step 700);

it receives the URIs (step 750), thereby univocally determining the internet domain of each over-represented SIP source cluster;

it checks whether the IP addresses obtained in the previous step match IP address patterns belonging to the local Intranet, thus verifying if the source clusters are internal to the local Intranet, or external to it;

it generates a list (Internal Source Clusters or ISC list) containing the data of the source clusters that are internal to the intranet; if no internal source clusters are found, the ISC list is an empty list;

it sends a JMS message including the ISC list to the RE module 76 (step 800).

The RE module 76, after reception of the message, browses the rules belonging to the AA and AC control logic.

For example, the following AC rule is found:

| Conditional part | Action part |
| --- | --- |
| IF - the SCA analysis results in a non-empty SIP FROM URI list AND - the ICA analysis results in a nonempty ISC list | THEN - Execute the Local Administrator Notification Countermeasure about sources in the ISC list |

This AC rule prescribes, if the SCA results in a nonempty list of over-represented source addresses and the ICA results in some sources being internal to the local Intranet, to activate a Local Administrator Notification Countermeasure (LANC) and may be expressed as follows:

```
Rule type="AC">
    <IF>
        <AND>
            <Condition>
                <Event type="analysis_result" element=" SCA_v4.3"
    results_var="SCA_res" condition="non-empty"/>
            </Condition>
            <Condition>
                <Event type="analysis_result" element=" ICA_v2.2"
    results_var="ICA_res" condition="non-empty"/>
            </Condition>
        </AND>
    </IF>
    <THEN>
        <Action type="execute" element="LANC_v1.4"
        input=SCA_res
input=ICA_res>
    </THEN>
</Rule>
```

Let's suppose that both the conditions of the rule hold. Then, the RE module 76 sends a JMS message to the LANC module 75, requesting the execution of the countermeasure and including the results of both SCA and ICA analyses as a part of the message (step 900).

When the LANC module 75 receives the JMS message from the RE module 76, it writes automatically an e-mail message to the mail address of the local intranet administrator, including the following information:

the date and time of the possible DoS alarm;

a summary with the results of the SCA, reporting the list of over-represented SIP source clusters;

a summary with the results of the ICA, reporting the list of over-represented SIP source clusters internal to the local Intranet;

a summary of the SA, AA and AC rules triggered, together with a concise explanation, in natural language, of their meaning.

Thus, the LANC module 75 give a concise report to the local administrator about the presence, in the intranet, of one or more anomalous sources of SIP message traffic, provoking a DoS situation. This way the administrator is able to perform opportune and focused actions in order to solve the DoS problem.

In the alternative, the LANC module 75 gives the local administrator all the information necessary to meet the malicious DoS problem.

As clear from the above, the present system and method are highly effective to detect a wide specter of different situations that may give rise to DoS, either of the malicious or the misconfiguration type. Furthermore, by virtue of its flexibility, the invention may be easily adapted to any existing and future network and protocol. Moreover, by providing suitable rules focused to any present or future situation, it is possible to detect and trigger countermeasures against substantially all possible DoS situations.

Finally, it is clear that numerous modifications and variants can be made to the present invention, all falling within the scope of the invention, as defined in the appended claims. For example, although a specific type of sensor has been described, the invention is intended to be able to exploit a number of different specialized sensors (e.g. statistical sensors or logical sensors) whose alerts can be expanded through specific analysis of the network traffic and computer systems state. Thereby, it is possible to use simple and stateless sensors that are DoS-free and effective.

Although in the preferred embodiments each sensor of the detection system according to the invention is configured to monitor a specific event (e.g., the average time of the SIP call set-up, during which the SIP proxy maintains the state), a sensor can be configured to monitor a set of few events.

Furthermore, the flow analyser may be a simpler element, that keeps information regarding data packets passing through it, in which case the sensors should include some ability to distinguish among different requests, or may be able to carry out a slightly more complex filtering operation, extracting packets related to specific requests.

The invention claimed is:

1. A method for managing denial of service situations at an application level in a communications network receiving message data, comprising sequentially:
   determining a first analysis to be performed associated with an event message generated in response to monitoring of said message data, the determining comprising
      performing a browsing of event rules, each event rule comprising a conditional clause and an associated first action to be taken, and
      determining a first event rule comprising said event message as the conditional clause and said first analysis as the first action to be taken;
   after said determining said first analysis, generating a request of said first analysis;
   receiving a first result message based on performance of said first analysis; and
   after receiving said first result message, determining a second action to be taken associated with said first result message comprising
      performing a first browsing of results rules, each results rule comprising a conditional clause and an associated action to be taken, and
      determining a first results rule comprising said first result message as a conditional clause and a further analysis as the action to be taken;
   after said determining said second action, generating a request of said further analysis; and
   generating a countermeasure message according to a countermeasure to be taken.

2. The method of claim 1, further comprising, before said generating a countermeasure message:
   receiving a second result message based on performance of said further analysis;
   performing a second browsing of said results rules; and
   determining a second results rule comprising said second result message as a conditional clause.

3. The method of claim 2, wherein, in case said second results rule specifies another analysis as an action to be taken, the method further comprises:
   generating a request of another analysis;
   receiving a third result message based on performance of said another analysis;
   performing a third browsing of said results rules; and
   determining a third results rule, as long as said second results rule specifies another analysis as an action to be taken, and generating said countermeasure message when said third results rule specifies said countermeasure as an action to be taken.

4. The method of claim 3, wherein said first, second and third analyses are performed by respective analysis modules.

5. The system of claim 3, wherein said first, second and third browsing are performed by a same control logic unit.

6. The method of claim 2, wherein said performing said further analysis comprises detecting internal and external sources.

7. The method of claim 6, wherein said detecting internal and external sources comprises checking whether said source matches a stored address and, in case of matching, generating an internal address list comprising said stored address.

8. The method of claim 1, wherein said performing said first analysis comprises clustering of sources of said message data.

9. The method of claim 8, wherein said clustering of sources comprises retrieving information regarding an event associated with said event message; retrieving information regarding sources of said message data; and generating a list based on said sources, wherein said generating a first result message comprises attaching said list.

10. The method of claim 9, wherein said generating a list comprises counting message data received from each source and listing overrepresented sources whose counting exceeds a threshold.

11. The method of claim 1, wherein said generating a countermeasure message comprises sending an alarm message comprising data related to said event and result messages.

12. The method of claim 1, wherein said communications network is a simple mail transfer protocol, a hypertext transfer protocol, a session initiation protocol, a common object request broker architecture or a web services network.

13. A system for managing denial of service situations at an application level in a communications network receiving message data, comprising:
   at least one event sensor configured to monitor said message data and to generate at least one event message;
   a control logic configured to receive said event message and to detect denial of service situations;
   a plurality of analysis modules connected to said control logic and each configured to execute at least one analysis and to generate a result message;
   a frequency sensor connected to at least one of said plurality of analysis modules and configured to determine a rate of arrival of a plurality of communication requests within a predetermined time period; and
   said control logic being configured to determine an analysis to be performed associated with said event message, to generate a request of said analysis for at least one of said plurality of analysis modules, to receive said result message from said requested analysis module, to determine an action to be taken associated with said result message, to iterate at least once the generating a request, receiving a result message, and determining an action, and to generate a countermeasure message according to a countermeasure to be taken;

a rule memory structure connected to said control logic and storing a plurality of rules, the rules comprising event rules and results rules, each rule comprising at least one conditional clause and an associated action to be taken, said control logic being configured to browse said rule memory structure when receiving said event messages, to detect an event rule comprising said event message as a conditional clause and said analysis as the action to be taken, and to browse said rule memory structure to detect a results rule comprising said result message as a conditional clause and a further analysis or a countermeasure as the associated action to be taken.

14. The system of claim 13, wherein each of said analysis modules is configured to perform its own analysis.

15. The system of claim 13, further comprising a connection network connected to said event sensor, said control logic and said analysis modules and configured to transmit said message data, said event message, said request, said result message and said countermeasure message.

16. The system of claim 13, comprising a countermeasure module connected to said connection network, said countermeasure module being configured to receive said countermeasure message from said control logic and to perform a countermeasure.

17. The system of claim 16, wherein said countermeasure module is configured to generate a message chosen between an alarm message sent to a system's human security administrator and an automatic feed-back message comprising configuration information for clients of said system.

18. The system of any of claim 13, further comprising a flow analyzer module connected between an outside network and said event sensor and configured to receive said message data and to transmit at least some of said message data to said event sensor.

19. The system of claim 18, wherein said flow analyzer module is configured to check said data messages and to transmit to said event sensor only data messages comprising a preset connection request.

20. The system of claim 19, wherein said frequency sensor comprises a rate monitoring module configured to monitor a rate of arrival of communication requests within a presettable time.

21. The system of claim 20, wherein said rate monitoring module comprises a counter configured to generate a counting output and comparator configured to generate a trigger output when said counting output exceeds a threshold within said presettable time.

22. The system of claim 21, wherein said threshold is calculated as a percentile of incoming requests in said presettable time.

23. The system of claim 13, wherein said event sensor is a frequency sensor.

24. The system of claim 13, wherein said communications network is a simple mail transfer protocol, a hypertext transfer protocol, a session initiation protocol, a common object request broker architecture or a web services network.

25. The system of claim 13, comprising a plurality of clients having own source addresses, wherein said analysis modules comprise a source clustering analysis module and an intranet check analysis module, said source clustering analysis module being configured to count the number of distinct data message source addresses, to compare said number of distinct data message source addresses to a preset dimension threshold and to generate a list of source addresses exceeding said preset dimension threshold; and said intranet check analysis module being configured to compare said source addresses exceeding said predefined dimension threshold with said own source addresses and to generate a list of said own source addresses that exceed said preset dimension threshold.

* * * * *